(12) United States Patent
Maetani et al.

(10) Patent No.: US 9,748,789 B2
(45) Date of Patent: Aug. 29, 2017

(54) CHARGING/DISCHARGING CONTROL CIRCUIT, CHARGING/DISCHARGING CONTROL DEVICE, AND BATTERY DEVICE

(71) Applicant: Seiko Instruments Inc., Chiba-shi, Chiba (JP)

(72) Inventors: Fumihiko Maetani, Chiba (JP); Toshiyuki Koike, Chiba (JP)

(73) Assignee: SII SEMICONDUCTOR CORPORATION, Chiba (JP)

( * ) Notice: Subject to any disclaimer, the term of this patent is extended or adjusted under 35 U.S.C. 154(b) by 255 days.

(21) Appl. No.: 14/202,602

(22) Filed: Mar. 10, 2014

(65) Prior Publication Data
US 2014/0253044 A1 Sep. 11, 2014

(30) Foreign Application Priority Data

Mar. 11, 2013 (JP) .................................. 2013-048455
Nov. 14, 2013 (JP) .................................. 2013-236244

(51) Int. Cl.
*H02J 7/00* (2006.01)
*H02H 7/18* (2006.01)

(52) U.S. Cl.
CPC ............. *H02J 7/0078* (2013.01); *H02H 7/18* (2013.01); *H02J 7/0031* (2013.01); *H02J 2007/0039* (2013.01)

(58) Field of Classification Search
CPC ..................................................... H02J 7/0029
USPC ........................................................ 320/134
See application file for complete search history.

(56) References Cited

U.S. PATENT DOCUMENTS

| 8,081,410 | B1* | 12/2011 | Wang | .................... | H02J 7/0031 |
| | | | | | 361/93.1 |
| 2008/0224664 | A1* | 9/2008 | Sano | .................... | H02J 7/0031 |
| | | | | | 320/134 |
| 2010/0033129 | A1* | 2/2010 | Li | ......................... | H02J 7/0072 |
| | | | | | 320/118 |

FOREIGN PATENT DOCUMENTS

JP 2004-104956 A 4/2004

* cited by examiner

*Primary Examiner* — Robert Grant
*Assistant Examiner* — Harry O'Neill-Becerril
(74) *Attorney, Agent, or Firm* — Brinks Gilson & Lione

(57) ABSTRACT

There is provided a battery device in which the accuracy of an over-current detection current value is high to have high safety. In a charging/discharging control circuit, a reference voltage circuit of an over-current detection circuit is configured to include a constant current circuit, a resistor, and a transistor having a resistance value that varies with a voltage of a secondary cell, that are connected to both ends of the secondary cell, and outputs, as a reference voltage, a voltage that is generated due to the flowing of a current of the constant current circuit to the resistor and the transistor.

5 Claims, 5 Drawing Sheets

CHARGING/DISCHARGING CONTROL CIRCUIT, CHARGING/DISCHARGING CONTROL DEVICE, AND BATTERY DEVICE

RELATED APPLICATIONS

This application claims priority under 35 U.S.C. §119 to Japanese Patent Application Nos. 2013-048455 filed on Mar. 11, 2013 and 2013-236244 filed on Nov. 14, 2013, the entire contents of which are hereby incorporated by reference.

BACKGROUND OF THE INVENTION

Field of the Invention

The present invention relates to a charging/discharging control circuit that controls charging and discharging of a secondary cell, a charging/discharging control device, and a battery device, and particularly, to a technology of preventing a current from excessively flowing to a mechanism connected to a battery or a battery device.

Background Art

FIG. 4 illustrates a circuit diagram of a conventional battery device.

The conventional battery device is configured to include a secondary cell 11, an Nch discharging control field effect transistor 12, an Nch charging control field effect transistor 13, a charging/discharging control circuit 14, resistors 22 and 31, a capacity 32, and external terminals 20 and 21. The charging/discharging control circuit 14 is configured to include a control circuit 15, an over-current detection circuit 16, an over-current detection terminal 19, a charging control signal output terminal 41, a discharging control signal output terminal 42, a positive electrode power source terminal 44, and a negative electrode power source terminal 43. The over-current detection circuit 16 is configured to include a comparator circuit 18 and a reference voltage circuit 17.

Next, an operation of the conventional battery device will be described.

When a load is connected between the external terminals 20 and 21 and a current flows, a potential difference is generated between a negative electrode of the secondary cell 11 and the external terminal 21. The potential difference is determined by a current amount $I_1$ of the current flowing between the external terminals 20 and 21, a resistance value $R_{12}$ of the Nch discharging control field effect transistor 12, and a resistance value $R_{13}$ of the Nch charging control field effect transistor 13, and is expressed as $I_1 \times (R_{12}+R_{13})$. The voltage of the over-current detection terminal 19 is equal to the voltage of the external terminal 21. The comparator circuit 18 compares the voltage of the reference voltage circuit 17 with the voltage of the over-current detection terminal 19, and when the voltage of the over-current detection terminal 19 is higher, the Nch discharging control field effect transistor 12 is turned off to provide over-current protection.

A set over-current detection current value is $I_{DOP}$, the voltage of the reference voltage circuit 17 is $V_{17}$, the resistance value of the Nch discharging control field effect transistor 12 is $R_{12}$, and the resistance value of the Nch charging control field effect transistor 13 is $R_{13}$. The voltage of the external terminal 21 when a threshold voltage is reached at which the comparator circuit 18 outputs a detection signal is $V_{17}$. At this time, the current flowing between the external terminals 20 and 21 is calculated by dividing the voltage of the external terminal 21 by the sum of the resistance values of the Nch discharging control field effect transistor 12 and the Nch charging control field effect transistor 13, and is expressed as $I_{DOP}=V_{17}/(R_{12}+R_{13})$.

The voltage of the over-current detection terminal of the charging/discharging control circuit when the comparator circuit 18 outputs a detection signal is referred to as an over-current detection voltage.

[Patent Document 1] Japanese Patent Application Laid-Open No. 2004-104956

SUMMARY OF THE INVENTION

However, in the conventional technology, the over-current detection voltage of the charging/discharging control circuit is constant even with changes in voltage of the secondary cell and temperature, but the resistance value of the Nch charging/discharging control field effect transistor varies with the changes in voltage of the secondary cell and temperature, and thus the over-current detection current value fluctuates. Therefore, there are problems in that the accuracy of the over-current detection current value is reduced, and thus the battery device has low safety.

The invention is contrived to solve the above-described problems, and provides a battery device having high safety by improving the accuracy of an over-current detection current value.

To solve the conventional problems, a charging/discharging control circuit of the invention has the following configuration.

A reference voltage circuit of an over-current detection circuit is configured to include a constant current circuit, a resistor, and a transistor having a resistance value that varies with a voltage of a secondary cell, that are connected to both ends of the secondary cell.

According to the battery device of the invention, it is possible to match the dependency of an over-current detection voltage of a charging/discharging control circuit and the dependency of a resistance value of a charging/discharging control switch on voltage of the secondary cell and on temperature, and thus the accuracy of an over-current detection current value can be improved, and a battery device having high safety can be provided.

DESCRIPTION OF THE PREFERRED EMBODIMENTS

Hereinafter, embodiments will be described with reference to the drawings.

Examples

First Embodiment

Figure 1:
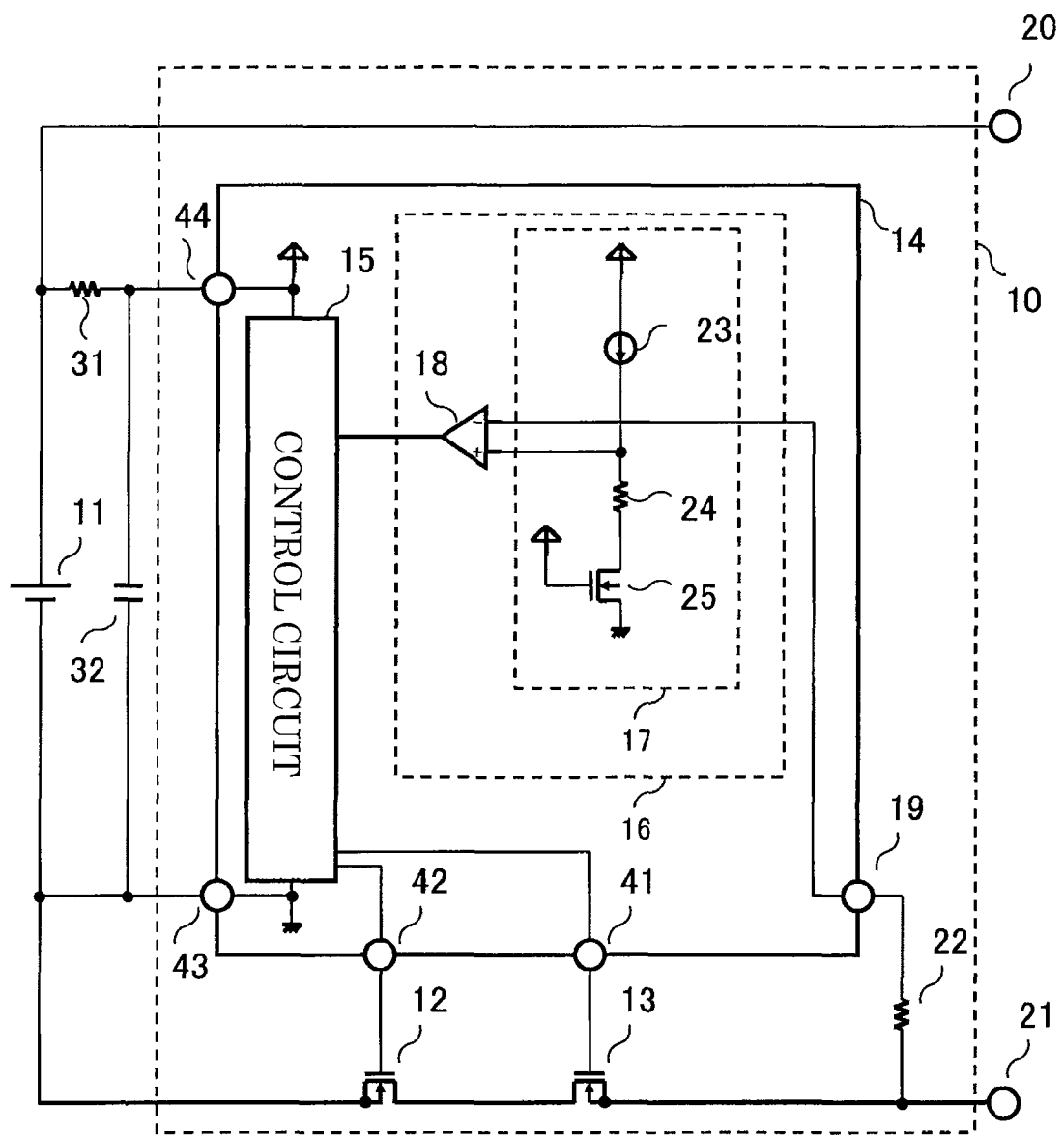
FIG. 1 is a circuit diagram of a battery device of a first embodiment.

FIG. 1 is a circuit diagram of a battery device of a first embodiment.

The battery device of the first embodiment is configured to include a secondary cell 11, an Nch discharging control field effect transistor 12, an Nch charging control field effect transistor 13, a charging/discharging control circuit 14, resistors 22 and 31, a capacity 32, and external terminals 20 and 21. A charging/discharging control device is configured to include the Nch discharging control field effect transistor 12, the Nch charging control field effect transistor 13, and the charging/discharging control circuit 14.

The charging/discharging control circuit 14 is configured to include a control circuit 15, an over-current detection circuit 16, an over-current detection terminal 19, a charging control signal output terminal 41, a discharging control signal output terminal 42, a positive electrode power source terminal 44, and a negative electrode power source terminal 43. The over-current detection circuit 16 is configured to include a comparator circuit 18, a constant current circuit 23, a resistor 24, and an NMOS transistor 25. A reference voltage circuit 17 is configured to include the constant current circuit 23, the resistor 24, and the NMOS transistor 25.

The secondary cell 11 is configured such that the positive electrode is connected to the external terminal 20 and the resistor 31, and the negative electrode is connected to the capacity 32, the negative electrode power source terminal 43, and a source and a backgate of the Nch discharging control field effect transistor 12. The positive electrode power source terminal 44 is connected to a connection point of the resistor 31 and the capacity 32. The Nch discharging control field effect transistor 12 is configured such that the gate is connected to the discharging control signal output terminal 42, and the drain is connected to a drain of the Nch charging control field effect transistor 13. The Nch charging control field effect transistor 13 is configured such that the gate is connected to the charging control signal output terminal 41, and the source and the backgate are connected to the external terminal 21 and the resistor 22. The other terminal of the resistor 22 is connected to the over-current detection terminal 19. The comparator circuit 18 is configured such that the inverted input terminal is connected to the over-current detection terminal 19, the non-inverted input terminal is connected to a connection point of the constant current circuit 23 and the resistor 24, and the output terminal is connected to the control circuit 15. The NMOS transistor 25 is configured such that the gate is connected to the positive electrode power source terminal 44, the drain is connected to the other terminal of the resistor 24, and the source is connected to the negative electrode power source terminal 43. The other terminal of the constant current circuit 23 is connected to the positive electrode power source terminal 44. The control circuit 15 is configured such that the first input is connected to the positive electrode power source terminal 44, the second input is connected to the negative electrode power source terminal 43, the first output is connected to the charging control signal output terminal 41, and the second output is connected to the discharging control signal output terminal 42.

Next, an operation of the battery device of the first embodiment will be described.

When a voltage of the secondary cell 11 is equal to or lower than an over-charging detection voltage and is equal to or higher than an over-discharging detection voltage, the Nch discharging control field effect transistor 12 and the Nch charging control field effect transistor 13 are controlled to be turned on. In this state, when a load is connected between the external terminals 20 and 21 and a discharging current flows, a potential difference is generated between a negative electrode of the secondary cell 11 and the external terminal 21. The potential difference is determined by a current amount $I_1$ of the current flowing between the external terminals 20 and 21, a resistance value $R_{12}$ of the Nch discharging control field effect transistor 12, and a resistance value $R_{13}$ of the Nch charging control field effect transistor 13, and is expressed as $I_1 \times (R_{12}+R_{13})$.

The constant current circuit 23 allows a current to flow to the resistor 24 and the NMOS transistor 25 to generate a voltage. The voltage is output as an output voltage of the reference voltage circuit 17. The comparator circuit 18 compares the voltage of the reference voltage circuit 17 with the voltage of the over-current detection terminal 19, and when the voltage of the over-current detection terminal 19 is higher, a detection signal is output to the control circuit 15 to turn off the Nch discharging control field effect transistor 12 to thus provide over-current protection.

A set over-current detection current value is $I_{DOP}$, the voltage of the reference voltage circuit 17 is $V_{17}$, the resistance value of the Nch discharging control field effect transistor 12 is $R_{12}$, and the resistance value of the Nch charging control field effect transistor 13 is $R_{13}$. The voltage of the external terminal 21 when a threshold voltage is reached at which the comparator circuit 18 outputs a detection signal is $V_{17}$. At this time, the current flowing between the external terminals 20 and 21 is calculated by dividing the voltage of the external terminal 21 by the sum of the resistance values of the Nch discharging control field effect transistor 12 and the Nch charging control field effect transistor 13, and is expressed as $I_{DOP}=V_{17}/(R_{12}+R_{13})$.

Here, it goes without saying that the resistance value of the Nch field effect transistor has dependency on voltage between the gate and the source and on temperature. A source potential of the Nch charging/discharging control field effect transistor of the first embodiment is a negative electrode potential of the secondary cell, and a gate potential is a positive electrode potential of the secondary cell. Accordingly, the resistance value $(R_{12}+R_{13})$ of the Nch charging/discharging control field effect transistor of the first embodiment has dependency on voltage of the secondary cell and on temperature.

The NMOS transistor 25 is configured such that the source is connected to the negative electrode power source terminal 43, and the gate is connected to the positive electrode power source terminal 44. Thus, the voltage between the gate and the source thereof is in the same state as the Nch charging/discharging control field effect transistor. When a W length and an L length of the NMOS transistor 25 and the amount of the inflowing current are changed using the constant current circuit 23, the dependency on voltage of the secondary cell can be adjusted. In addition, in order to adjust the over-current detection current value $I_{DOP}$, it is necessary to adjust an absolute value of the output voltage of the reference voltage circuit 17 since value $I_{DOP}$ is expressed as $V_{17}/(R_{12}+R_{13})$. The value of the resistor 24 is optimized in response to the current value of the constant current circuit 23 so that $V_{17}$ is equal to $I_{DOP} \times (R_{12}+R_{13})$, and thus a target value of the over-current detection current is adjusted. In addition, temperature characteristics of the resistor 24 can be adjusted with a method of preparing the element. When the absolute value of $V_{17}$ is adjusted, the temperature characteristics of the resistor 24 are also optimized so that temperature characteristics of $V_{17}$ match temperature characteristics of the Nch charging/discharging control transistor.

In this manner, the dependency of the value of the voltage $V_{17}$ of the reference voltage circuit 17 on voltage of the secondary cell and on temperature can be adjusted, and thus it is allowed to match the dependency of the resistance value of the Nch charging/discharging control field effect transistor on voltage of the secondary cell and on temperature, and the set over-current detection current value $I_{DOP}$ can thus be made constant even with changes in voltage of the secondary cell and temperature.

The gate of the NMOS transistor 25 corresponds to the positive electrode power source terminal 44 of the charging/discharging control circuit 14. However, if it is connected to the output of a circuit having dependency on voltage of the secondary cell to adjust the value of the constant current, the same effects as the first embodiment can be exhibited since it is preferable that the resistance value vary with the detected voltage of the secondary cell. In addition, although the description has been described using the Nch discharging control field effect transistor 12, the Nch charging control field effect transistor 13, and the NMOS transistor 25, the invention is not limited to this configuration, and it goes without saying that even when Pch field effect transistors are used, a PMOS transistor is used in place of the NMOS transistor 25, and the connection of the constant current circuit 23 to the positive electrode power source terminal 44 is changed to the connection to the negative electrode power source terminal 43, the same operation can be performed. In addition, it is obvious that the invention can be used not only when only the discharging current of the battery is controlled, but also when only the charging current is controlled.

As described above, in the battery device of the first embodiment, the dependency of an over-current detection voltage of the charging/discharging control circuit matches the dependency of the Nch charging/discharging control field effect transistor on voltage of the secondary cell and on temperature, and thus the accuracy of an over-current detection current value of the battery device can be improved and the safety of the battery device can thus be increased.

Second Embodiment

Figure 2:
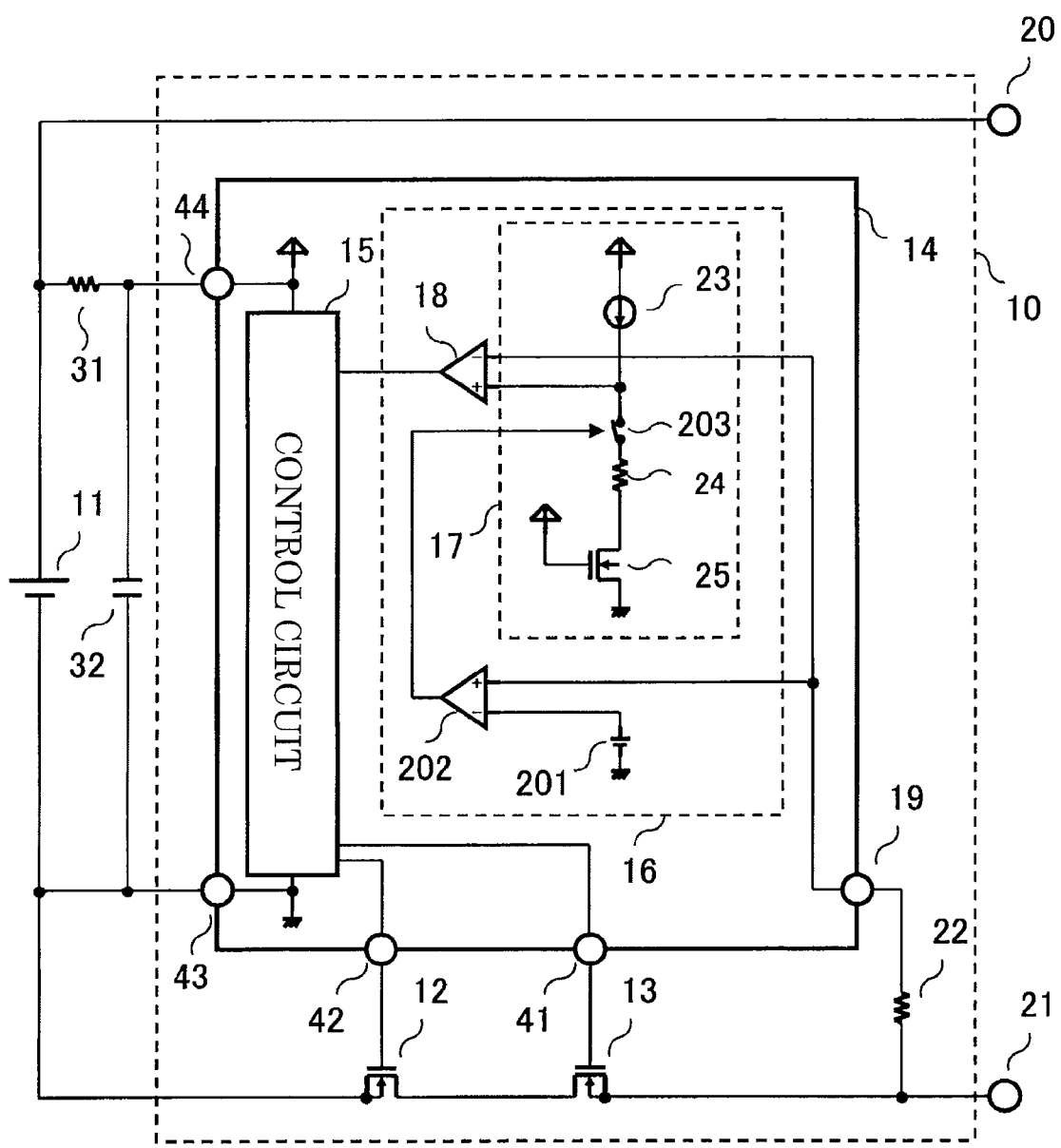
FIG. 2 is a circuit diagram of a battery device of a second embodiment.

FIG. 2 is a circuit diagram of a battery device of a second embodiment. The difference from the battery device of the first embodiment is that a switch circuit 203, a comparator circuit 202, and a reference voltage circuit 201 are added.

The connections in the battery device of the second embodiment will be described.

The comparator circuit 202 is configured such that the inverted input terminal is connected to the reference voltage circuit 201, the non-inverted input terminal is connected to the over-current detection terminal 19, and the output terminal is connected to the switch circuit 203 to control ON/OFF of the switch circuit 203. The other terminal of the reference voltage circuit 201 is connected to the negative electrode power source terminal 43. The switch circuit 203 is configured such that one terminal is connected to the constant current circuit 23, and the other terminal is connected to the resistor 24. Others are the same as the first embodiment.

Next, an operation of the battery device of the second embodiment will be described.

When a load is not connected between the external terminals 20 and 21 and a discharging current does not flow, the comparator circuit 202 controls the switch circuit 203 to turn it off, thereby interrupting the current flowing from the constant current circuit 23. As described above, when a discharging current does not flow, the power consumption can be reduced by interrupting the current from the constant current circuit 23.

When a load is connected between the external terminals 20 and 21 and a discharging current flows, a potential difference is generated between the negative electrode of the secondary cell 11 and the external terminal 21. The potential difference is determined by a current amount $I_1$ of the current flowing between the external terminals 20 and 21, a resistance value $R_{12}$ of the Nch discharging control field effect transistor 12, and a resistance value $R_{13}$ of the Nch charging control field effect transistor 13, and is expressed as $I_1 \times (R_{12}+R_{13})$. When the potential difference between the negative electrode of the secondary cell 11 and the external terminal 21 increases and becomes greater than the voltage of the reference voltage circuit 201, the comparator circuit 202 outputs a signal from the output terminal to turn on the switch circuit 203. The operation after the switch circuit 203 is turned on is the same as in the first embodiment.

In this manner, the dependency of the value of a voltage $V_{17}$ of the reference voltage circuit 17 on voltage of the secondary cell and on temperature can be adjusted, and thus it is allowed to match the dependency of the resistance value of the Nch charging/discharging control field effect transistor on voltage of the secondary cell and on temperature, and a set over-current detection current value $I_{DOP}$ can thus be made constant even with changes in voltage of the secondary cell and temperature.

The gate of the NMOS transistor 25 corresponds to the positive electrode power source terminal 44 of the charging/discharging control circuit 14. However, if it is connected to the output of a circuit having dependency on voltage of the secondary cell to adjust the value of the constant current, the same effects as the first embodiment can be exhibited since it is preferable that the resistance value vary with the detected voltage of the secondary cell. In addition, although the description has been described using the Nch discharging control field effect transistor 12, the Nch charging control field effect transistor 13, and the NMOS transistor 25, the invention is not limited to this configuration, and it goes without saying that even when Pch field effect transistors are used, a PMOS transistor is used in place of the NMOS transistor 25, and the connection of the constant current circuit 23 to the positive electrode power source terminal 44 is changed to the connection to the negative electrode power source terminal 43, the same operation can be performed. In addition, it is obvious that the invention can be used not only when only the discharging current of the battery is controlled, but also when only the charging current is controlled.

As described above, in the battery device of the second embodiment, the power consumption can be reduced by interrupting the current of the constant current circuit 23 when a discharging current does not flow. In addition, the dependency of an over-current detection voltage of the charging/discharging control circuit matches the dependency of the Nch charging/discharging control field effect transistor on voltage of the secondary cell and on temperature, and thus the accuracy of an over-current detection current value of the battery device can be improved and the safety of the battery device can thus be increased.

Third Embodiment

Figure 3:
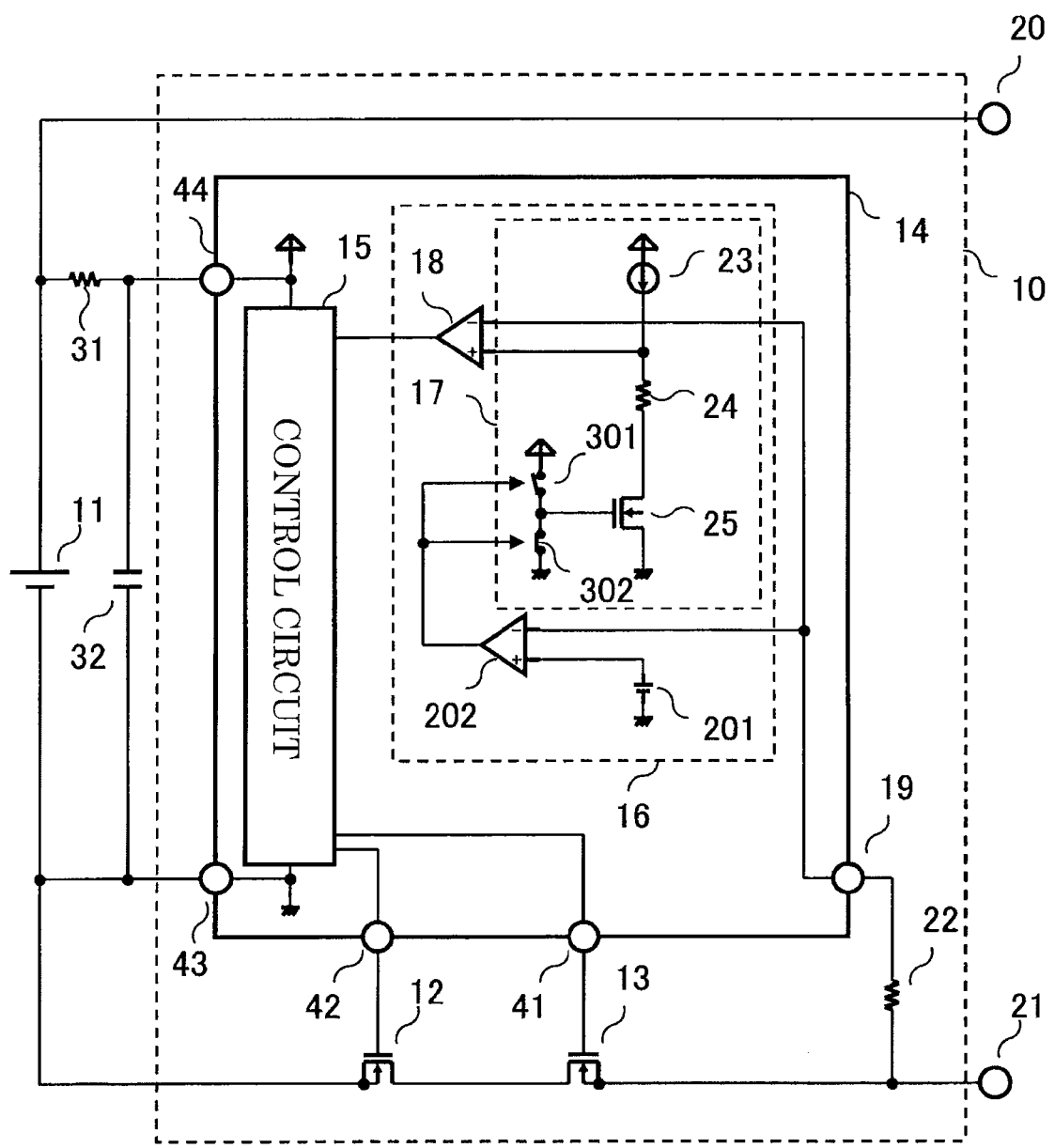
FIG. 3 is a circuit diagram of a battery device of a third embodiment.
Figure 4:
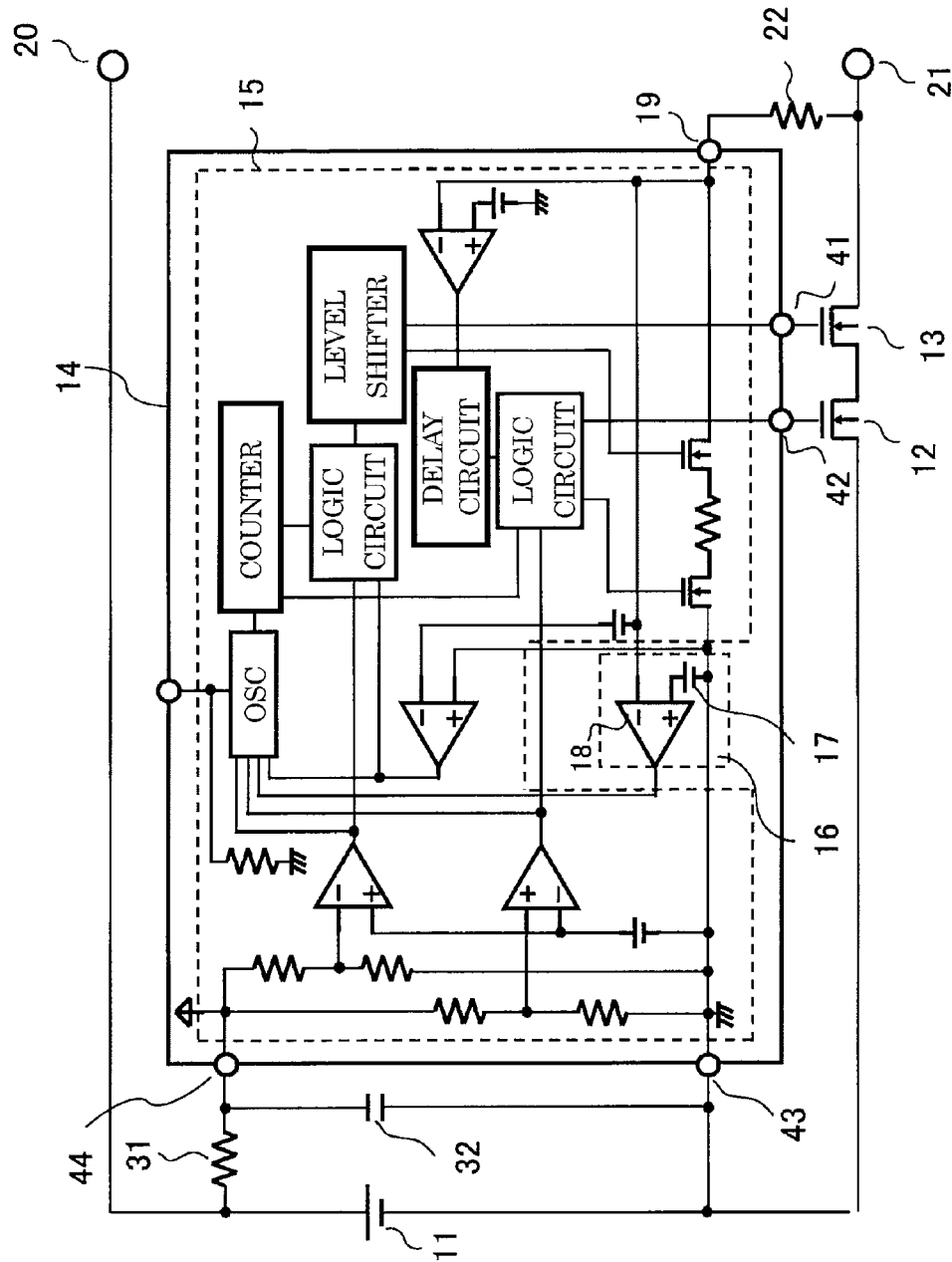
FIG. 4 is a circuit diagram of a conventional battery device.

FIG. 3 is a circuit diagram of a battery device of a third embodiment. The difference from the battery device of the second embodiment is that switches 301 and 302 are added and the switch circuit 203 is eliminated.

The connections in the battery device of the third embodiment will be described.

The comparator circuit 202 is configured such that the inverted input terminal is connected to the reference voltage circuit 201, the non-inverted input terminal is connected to the over-current detection terminal 19, and the output terminal is connected to the switch circuits 301 and 302 to control ON/OFF of the switch circuits 301 and 302. The other terminal of the reference voltage circuit 201 is connected to the negative electrode power source terminal 43. The switch circuit 301 is configured such that one terminal is connected to the positive electrode power source terminal 44, and the other terminal is connected to the gate of the NMOS transistor 25. The switch circuit 302 is configured such that one terminal is connected to the negative electrode power source terminal 43, and the other terminal is connected to the gate of the NMOS transistor 25. The constant current circuit 23 is configured such that one terminal is connected to the positive electrode power source terminal 44, and the other terminal is connected to the resistor 24. Others are the same as the second embodiment.

Next, an operation of the battery device of the third embodiment will be described.

When a load is not connected between the external terminals 20 and 21 and a discharging current does not flow, the comparator circuit 202 performs control to turn off the switch circuit 301 and to turn on the switch circuit 302 and turns off the NMOS transistor 25, thereby interrupting the current flowing from the constant current circuit 23. As described above, when a discharging current does not flow, the power consumption can be reduced by interrupting the current from the constant current circuit 23.

When a load is connected between the external terminals 20 and 21 and a discharging current flows, a potential difference is generated between the negative electrode of the secondary cell 11 and the external terminal 21. The potential difference is determined by a current amount $I_1$ of the current flowing between the external terminals 20 and 21, a resistance value $R_{12}$ of the Nch discharging control field effect transistor 12, and a resistance value $R_{13}$ of the Nch charging control field effect transistor 13, and is expressed as $I_1 \times (R_{12}+R_{13})$. When the potential difference between the negative electrode of the secondary cell 11 and the external terminal 21 increases and becomes greater than the voltage of the reference voltage circuit 201, the comparator circuit 202 performs control to turn on the switch circuit 301 and to turn off the switch circuit 302, and turns on the NMOS transistor 25. The operation after the NMOS transistor 25 is turned on is the same as in the first embodiment.

In this manner, the dependency of the value of a voltage $V_{17}$ of the reference voltage circuit 17 on voltage of the secondary cell and on temperature can be adjusted, and thus it is allowed to match the dependency of the resistance value of the Nch charging/discharging control field effect transistor on voltage of the secondary cell and on temperature, and a set over-current detection current value $I_{DOP}$ can thus be made constant even with changes in voltage of the secondary cell and temperature.

Although the description has been described using the Nch discharging control field effect transistor 12, the Nch charging control field effect transistor 13, and the NMOS transistor 25, the invention is not limited to this configuration, and it goes without saying that even when Pch field effect transistors are used, a PMOS transistor is used in place of the NMOS transistor 25, and the connection of the constant current circuit 23 to the positive electrode power source terminal 44 is changed to the connection to the negative electrode power source terminal 43, the same operation can be performed. In addition, it is obvious that the invention can be used not only when only the discharging current of the battery is controlled, but also when only the charging current is controlled.

As described above, in the battery device of the third embodiment, the power consumption can be reduced by interrupting the current of the constant current circuit 23 when a discharging current does not flow.

In addition, the dependency of an over-current detection voltage of the charging/discharging control circuit matches the dependency of the Nch charging/discharging control field effect transistor on voltage of the secondary cell and on temperature, and thus the accuracy of an over-current detection current value of the battery device can be improved and the safety of the battery device can thus be increased.

Fourth Embodiment

Figure 5:
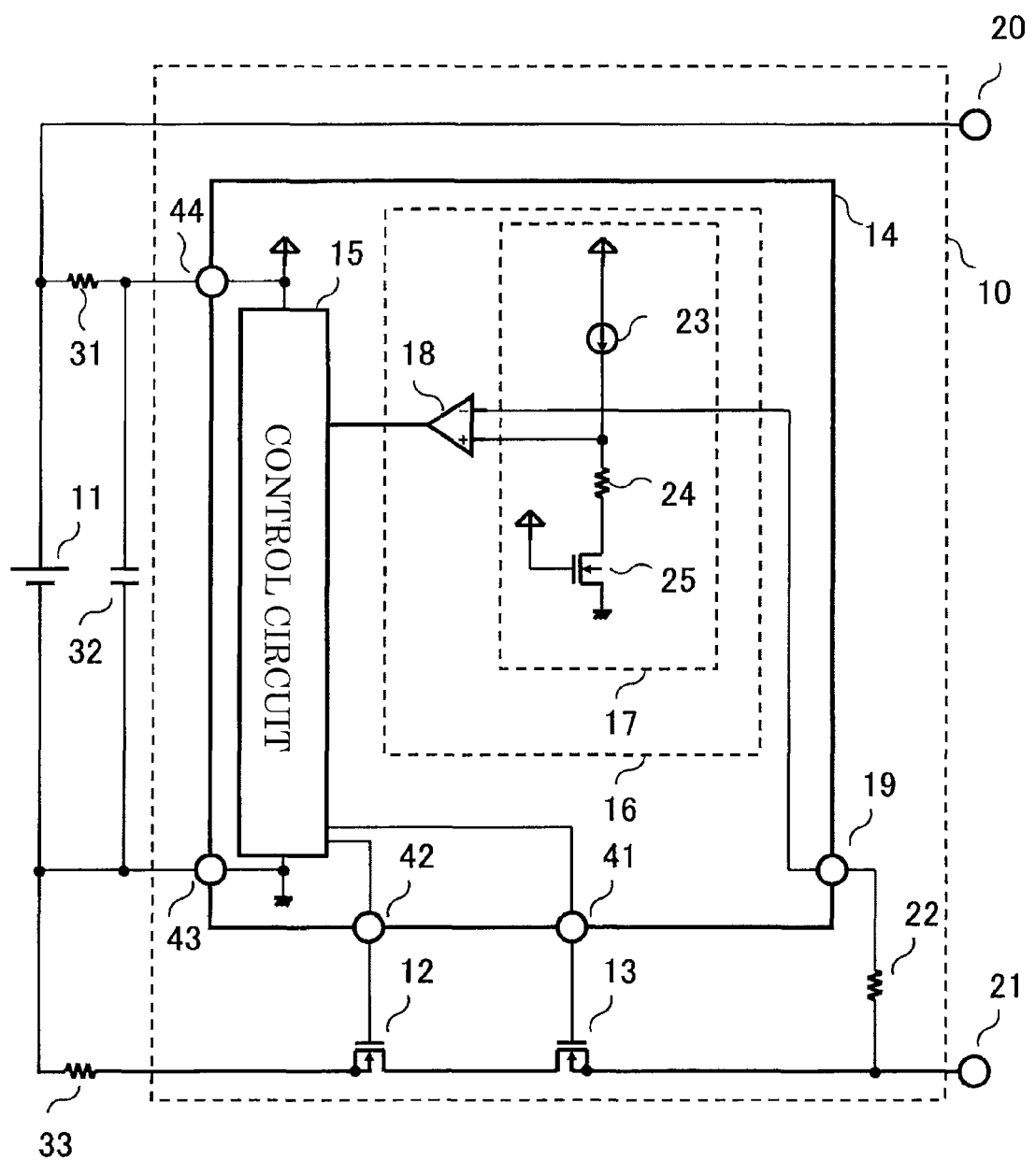
FIG. 5 is a circuit diagram of a battery device of a fourth embodiment.

FIG. 5 is a circuit diagram of a battery device of a fourth embodiment. The difference from the battery device of the first embodiment is that a resistor 33 is added between the connection point of the negative electrode of the secondary cell 11 and the negative electrode power source terminal 43 and the source of the Nch discharging control field effect transistor 12. Others are the same as the first embodiment.

On-resistance $R_{12}$ of the Nch discharging control field effect transistor 12 and on-resistance $R_{13}$ of the Nch charging control field effect transistor 13 are low in accuracy since these exhibit a large variation in the manufacturing process. Therefore, the variation in over-current detection current value can be reduced by providing the resistor 33 with less variation in resistance value than the Nch field effect transistor in series.

An over-current detection current value $I_{DOP}$ is expressed as $I_{DOP}=V_{17}/R_{12}+R_{13}+R_{33})$, and thus the larger the ratio of $R_{33}$ to $(R_{12}+R_{13}+R_{33})$, the less the effect of the variation in $R_{12}$ and in $R_{13}$, whereby the accuracy of the over-current detection current can be improved.

As described above, the sum $(R_{12}+R_{13})$ of the resistance values of the Nch charging/discharging control field effect transistors 12 and 13 is low in accuracy, and thus has dependency on voltage of the secondary cell and on temperature. Even when the resistance value of the resistor 33 is added, the resistance value $(R_{12}+R_{13}+R_{33})$ has dependency on voltage of the secondary cell and on temperature without change. In order to correct this, the constant current amount of the constant current circuit 23, the resistance value of the resistor 24, and the W length and the L length of the NMOS transistor 25 are optimized to match the dependency of a value of a voltage $V_{17}$ of the reference voltage circuit 17 and the dependency of the resistance value $(R_{12}+R_{13}+R_{33})$ on voltage of the secondary cell and on temperature. In this manner, the set over-current detection current value $I_{DOP}$ can be made constant even with changes in voltage of the secondary cell and temperature.

The position of the resistor 33 is not limited to one shown in FIG. 5, and may be provided anywhere as long as it is between the connection point of the negative electrode of the secondary cell 11 and the negative electrode power source terminal 43 and the connection point between the external terminal 21 and the resistor 22. In addition, the resistor 33 may not be a resistor provided intentionally, but be a parasitic resistor during when the circuit is configured. In addition, the resistance value between the connection point of the negative electrode of the secondary cell 11 and the negative electrode power source terminal 43 and the connection point of the external terminal 21 and the resistor 22 is ($R_{12}+R_{13}+R_{33}$) and the dependency of the value of the voltage $V_{17}$ of the reference voltage circuit 17 matches the dependency of the resistance value ($R_{12}+R_{13}+R_{33}$) on voltage of the secondary cell and on temperature, and thus the set over-current detection current value $I_{DOP}$ can be made constant even with changes in voltage of the secondary cell and temperature.

The gate of the NMOS transistor 25 corresponds to the positive electrode power source terminal 44 of the charging/discharging control circuit 14. However, if it is connected to the output of a circuit having dependency on voltage of the secondary cell to adjust the value of the constant current, the same effects as the first embodiment can be exhibited since it is preferable that the resistance value vary with the detected voltage of the secondary cell. In addition, although the description has been described using the Nch discharging control field effect transistor 12, the Nch charging control field effect transistor 13, and the NMOS transistor 25, the invention is not limited to this configuration, and it goes without saying that even when Pch field effect transistors are used, a PMOS transistor is used in place of the NMOS transistor 25, and the connection of the constant current circuit 23 to the positive electrode power source terminal 44 is changed to the connection to the negative electrode power source terminal 43, the same operation can be performed. In addition, it is obvious that the invention can be used not only when only the discharging current of the battery is controlled, but also when only the charging current is controlled.

As described above, in the battery device of the fourth embodiment, a resistor having a higher resistance value than the Nch charging/discharging control field effect transistor is connected to the Nch charging/discharging control field effect transistor, and thus the accuracy of an over-current detection current can be improved. In addition, the dependency of an over-current detection voltage of the charging/discharging control circuit matches the dependency of the Nch charging/discharging control field effect transistor on voltage of the secondary cell and on temperature, and thus the accuracy of an over-current detection current value of the battery device can be improved and the safety of the battery device can thus be increased.

What is claimed is:

1. A charging/discharging control circuit comprising:
   a control circuit that detects a voltage and abnormality of a secondary cell; and
   an over-current detection circuit that detects an over-current with a voltage of an over-current detection terminal,
   wherein the over-current detection circuit includes:
   a reference voltage circuit that includes a constant current circuit, a first resistor, a switch between the constant current circuit and the first resistor, and a transistor having a resistance value that varies with a voltage of the secondary cell, the reference voltage circuit outputting a voltage that is generated due to the flowing of a current of the constant current circuit to the resistor and the transistor,
   the over-current detection circuit further including a first comparator circuit that compares the voltage of the over-current detection terminal with the voltage of the reference voltage circuit and having an output connected to the control circuit, and
   a second comparator connected to the over-current detection terminal and to a second reference voltage circuit and having an output connected to the switch,
   wherein the second comparator is configured to output a signal from the over-current detection terminal to turn on the switch when a potential difference between the secondary cell and the over-current detection terminal is greater than a voltage of the second reference voltage circuit.

2. The charging/discharging control circuit according to claim 1, wherein the reference voltage circuit stops an operation in a state in which the voltage of the over-current detection terminal is equal to or lower than a predetermined voltage.

3. A charging/discharging control device comprising:
   a charging/discharging control switch in a charging/discharging path of a secondary cell; and
   the charging/discharging control circuit according to claim 1 that monitors the voltage of the secondary cell and controls the charging/discharging control switch.

4. A battery device comprising:
   the secondary cell; and
   the charging/discharging control device according to claim 3.

5. The battery device according to claim 4, further comprising:
   a second resistor in the charging/discharging path of the secondary cell in connection with the charging/discharging control switch.

* * * * *